(12) United States Patent
Gretz

(10) Patent No.: US 10,593,445 B2
(45) Date of Patent: *Mar. 17, 2020

(54) ELECTRICAL INSIDER FITTING FOR INTERNAL CONNECTION TO AN ELECTRICAL BOX

(71) Applicant: Arlington Industries, Inc., Scranton, PA (US)

(72) Inventor: Thomas J. Gretz, Port St. Lucie, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/294,498

(22) Filed: Mar. 6, 2019

(65) Prior Publication Data

US 2019/0198200 A1    Jun. 27, 2019

Related U.S. Application Data

(63) Continuation of application No. 14/602,653, filed on Jan. 22, 2015, now Pat. No. 10,269,473.

(60) Provisional application No. 61/949,620, filed on Mar. 7, 2014.

(51) Int. Cl.
| | |
|---|---|
| *H01B 17/26* | (2006.01) |
| *H02G 3/06* | (2006.01) |
| *H02G 3/16* | (2006.01) |
| *H02G 3/18* | (2006.01) |
| *H02G 3/22* | (2006.01) |
| *H02G 3/08* | (2006.01) |

(52) U.S. Cl.
CPC ............ *H01B 17/26* (2013.01); *H02G 3/06* (2013.01); *H02G 3/065* (2013.01); *H02G 3/0683* (2013.01); *H02G 3/0691* (2013.01); *H02G 3/083* (2013.01); *H02G 3/0616* (2013.01); *H02G 3/16* (2013.01); *H02G 3/18* (2013.01); *H02G 3/22* (2013.01)

(58) Field of Classification Search
CPC ........ H01B 17/26; H02G 3/06; H02G 3/0683; H02G 3/0691; H02G 3/083; H02G 3/0616; H02G 3/16; H02G 3/18; H02G 3/22
USPC .......................................... 174/660
See application file for complete search history.

(56) References Cited

U.S. PATENT DOCUMENTS

| | | | | |
|---|---|---|---|---|
| 1,483,218 | A | * | 2/1924 | Fahnestock ............ H02G 3/083 174/153 G |
| 2,324,791 | A | * | 7/1943 | McLoughlin ........ H02G 3/0616 220/3.8 |

(Continued)

*Primary Examiner* — Timothy J Thompson
*Assistant Examiner* — Michael F McAllister

(57) ABSTRACT

An electrical fitting adapted for insertion from the interior of an electrical box in order to provide a secure means for attaching an electrical cable to the box. The electrical insider fitting includes a connector body having a leading end, a trailing end, and a base flange on the trailing end. A leading face is included on the base flange and a seat on the connector body adjacent the leading face of the base flange. A snap ring resides in the seat and includes one or more outward extending locking tangs. The leading end of the connector body includes an internal bore with an internal snap ring secured therein. The internal snap ring includes one or more cable retaining tangs for engaging and securing an electrical cable to the leading end of the connector body.

11 Claims, 8 Drawing Sheets

(56) References Cited

U.S. PATENT DOCUMENTS

| | | | | |
|---|---|---|---|---|
| 3,643,987 | A * | 2/1972 | DuPont | F16L 37/008 |
| | | | | 285/205 |
| 6,043,432 | A | 3/2000 | Gretz | |
| 6,080,933 | A | 6/2000 | Gretz | |
| 6,335,488 | B1 * | 1/2002 | Gretz | H02G 3/0691 |
| | | | | 16/2.1 |
| 6,352,439 | B1 * | 3/2002 | Stark | F16L 37/008 |
| | | | | 174/655 |
| 6,709,280 | B1 | 3/2004 | Gretz | |
| 6,849,803 | B1 * | 2/2005 | Gretz | H02G 3/0691 |
| | | | | 16/2.1 |
| 7,205,489 | B2 * | 4/2007 | Auray | H01R 4/646 |
| | | | | 174/650 |
| 7,214,890 | B2 * | 5/2007 | Kiely | H02G 3/0683 |
| | | | | 174/659 |
| 7,358,448 | B2 | 4/2008 | Auray et al. | |
| 7,476,817 | B1 * | 1/2009 | Shemtov | H01R 13/5816 |
| | | | | 174/661 |
| 7,723,623 | B2 * | 5/2010 | Kiely | F16L 5/00 |
| | | | | 174/650 |
| 7,854,627 | B1 * | 12/2010 | Gretz | H02G 3/083 |
| | | | | 439/557 |
| 8,143,535 | B2 * | 3/2012 | Auray | F16L 5/00 |
| | | | | 174/650 |
| 8,253,043 | B1 | 8/2012 | Kiely | |
| 8,415,571 | B2 * | 4/2013 | Kiely | H01R 13/74 |
| | | | | 174/669 |
| 8,791,374 | B1 | 7/2014 | Smith | |

* cited by examiner

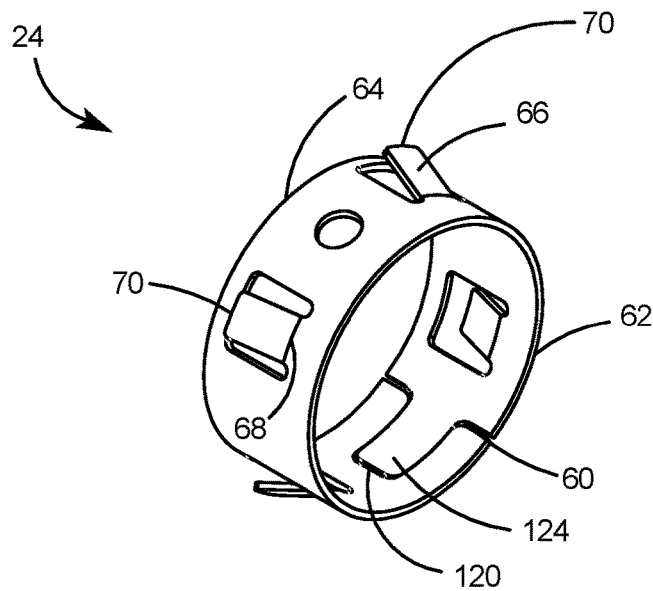
Fig. 10
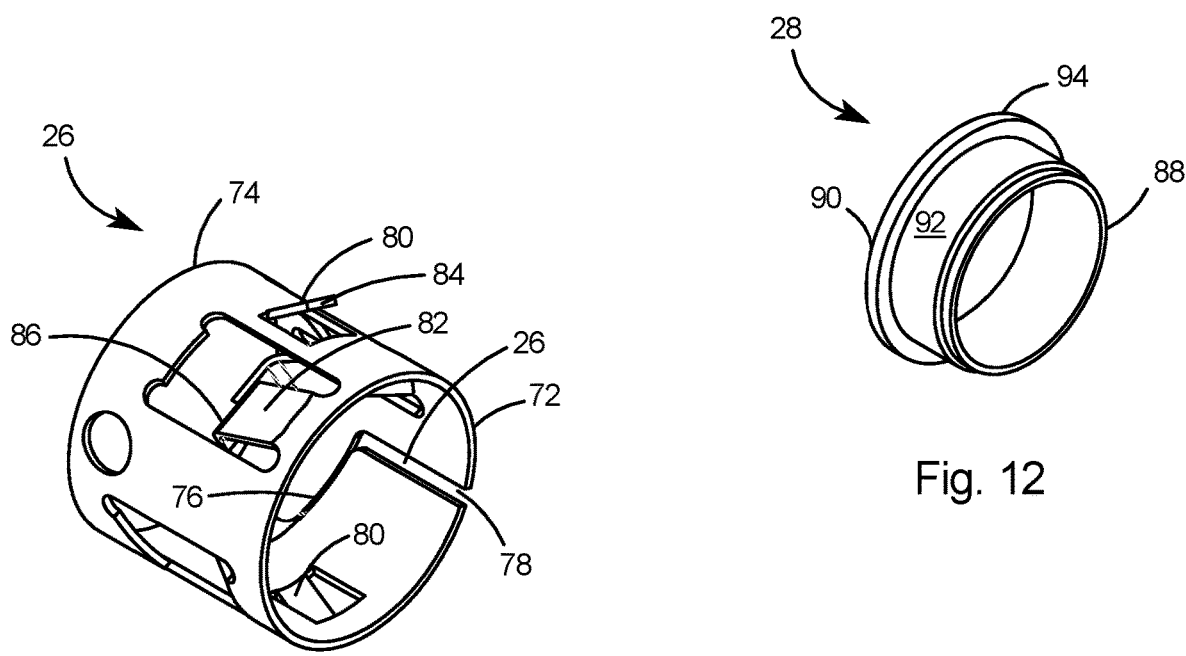
Fig. 11
Fig. 12 and then snapped into the electrical box.
ELECTRICAL INSIDER FITTING FOR INTERNAL CONNECTION TO AN ELECTRICAL BOX This application is a divisional application of U.S. patent application Ser. No. 14/602,653 filed Jan. 22, 2015 and claims the priority of Provisional U.S. Patent Application Ser. No. 61/949,620 filed Mar. 7, 2014.

FIELD OF THE INVENTION

The present invention relates to electrical boxes and specifically to electrical fittings for securing electrical cables to electrical boxes and panels.

BACKGROUND OF THE INVENTION

Quick-connect fittings are commonly used to rapidly connect electrical cables with electrical boxes. In a new work situation, in which the drywall has not yet been installed, electrical cables are pulled to the outside of the box and the quick-connect fitting is fitted on the electrical cable and then snapped into the electrical box.

However, in an old work situation, the outside of the electrical box is covered by the drywall, and, in order to use a conventional quick-connect fitting, the drywall must be removed and replaced, causing extended time for removing and reinstalling the drywall. Thus, conventional quick-connect fittings cannot be installed from the inside of an electrical box. Furthermore, manual electrical fittings, which require screwdrivers or similar tools to install, are impractical for installation from inside the box.

Accordingly, what is needed is an apparatus and method for quickly securing an electrical cable from the inside of an electrical box without the use of tools.

BRIEF SUMMARY OF THE INVENTION

The current invention is an electrical fitting adapted for insertion from the interior of an electrical box in order to provide a secure means for attaching an electrical cable to the box. The electrical insider fitting includes a connector body having a leading end, a trailing end, and a base flange on the trailing end. A leading face is included on the base flange and a seat on the connector body adjacent the leading face of the base flange. A snap ring resides in the seat and includes one or more outward extending locking tangs. The leading end of the connector body includes an internal bore with an internal snap ring secured therein. The internal snap ring includes one or more cable retaining tangs for engaging and securing an electrical cable to the leading end of the connector body.

OBJECTS AND ADVANTAGES

A first object of the current invention is to provide an electrical fitting that can be easily inserted from the interior of an electrical box in order to secure an electrical cable to the box.

A second object is to enable an installer to secure an electrical cable to an existing electrical box while avoiding having to remove drywall from the outside of the box. Conventional electrical fittings, both the manual and quick-connect type, are typically installed from the exterior of the box and therefore require the installer to first clear the area surrounding the box in order to install the conventional fitting Eliminating the need to remove and replace drywall substantially reduces the time and expense required to connect an electrical cable to an old work box.

A further object is to provide an apparatus and method to enable rapid connection of an electrical cable from the inside of an electrical box without the use of tools.

Another object is to provide an electrical fitting that secures to the inner surface an electrical box while taking up very little of the interior volume of the electrical box.

A further object is to provide an electrical insider fitting in which the portion inside the electrical box projects a minimal distance into the interior volume of the box.

These and other objects and advantages of the present invention will be better understood by reading the following description along with reference to the drawings.

BRIEF DESCRIPTION OF THE SEVERAL VIEWS OF THE DRAWING(S)

Reference is made herein to the accompanying drawings, which are not necessarily drawn to scale, and wherein:

FIG. 10 is an isometric view of a snap ring that forms a portion of the electrical insider fitting of FIG. 1.

FIG. 11 is an isometric view of an internal snap ring that forms a portion of the electrical insider fitting of FIG. 1.

FIG. 12 is an isometric view of an optional throat liner that forms a portion of the electrical insider fitting of FIG. 1.

DETAILED DESCRIPTION

Figure 1:
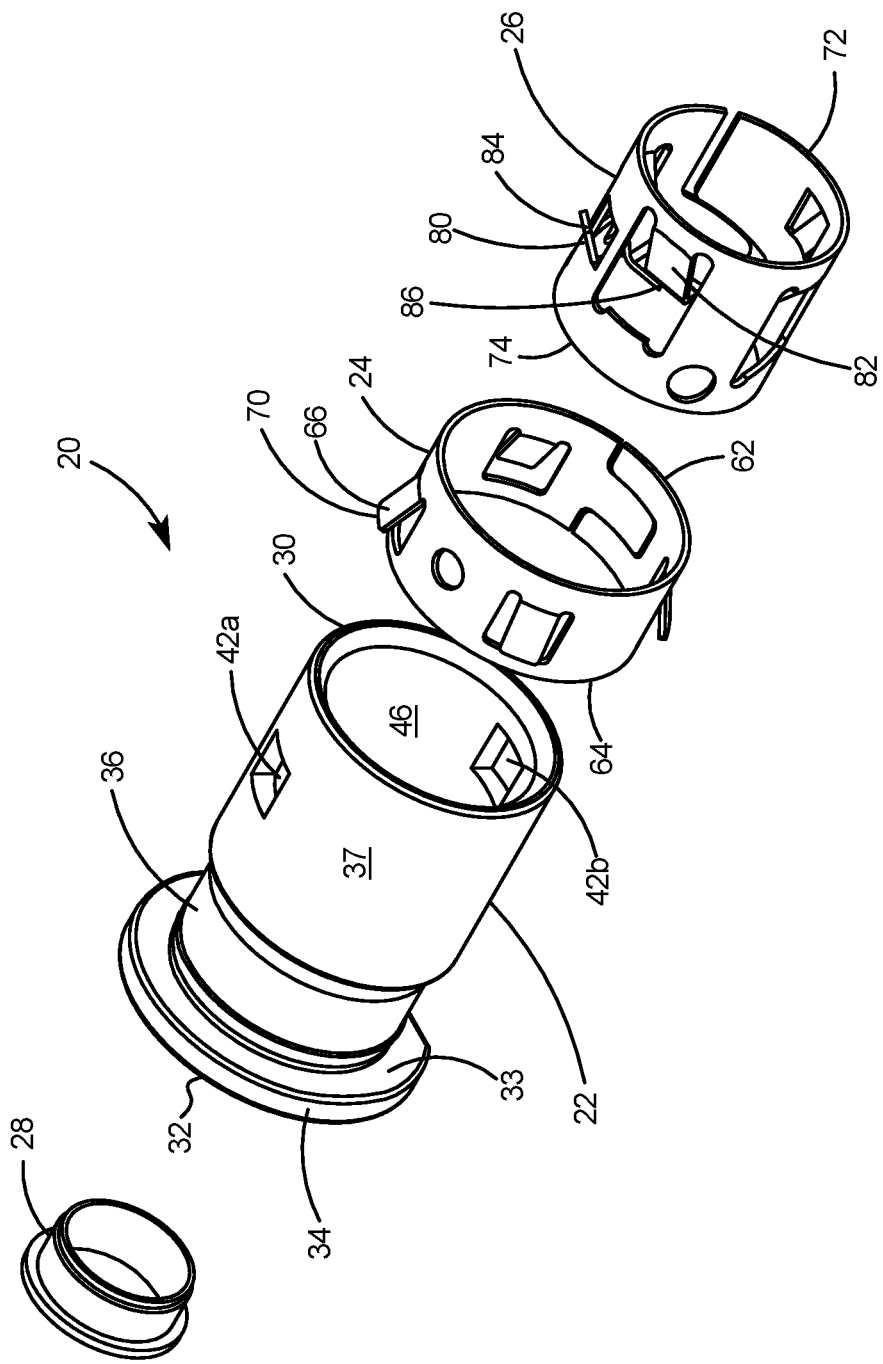
FIG. 1 is an exploded isometric view of an electrical insider fitting in accordance with embodiments of the invention.

With reference to FIG. 1, the present invention comprises an electrical insider fitting 20 for connecting an electrical cable to an electrical box. The electrical insider fitting 20 includes a connector body 22, an external snap ring 24, an internal snap ring 26, and an optional throat liner 28.

Figure 2:
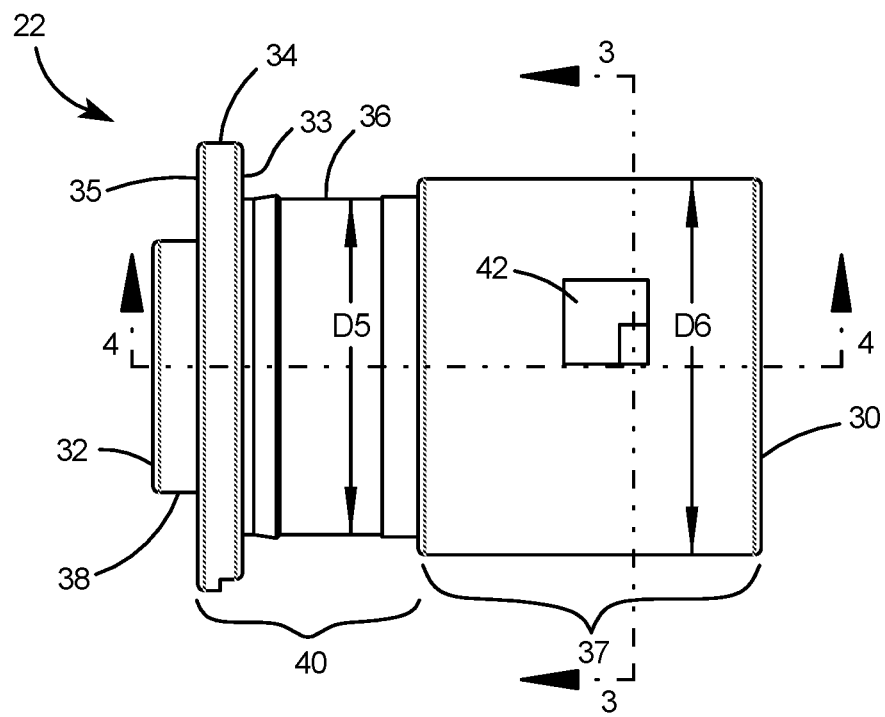
FIG. 2 is a side view of a connector body which forms a portion of the electrical insider fitting of FIG. 1.
Figure 3:
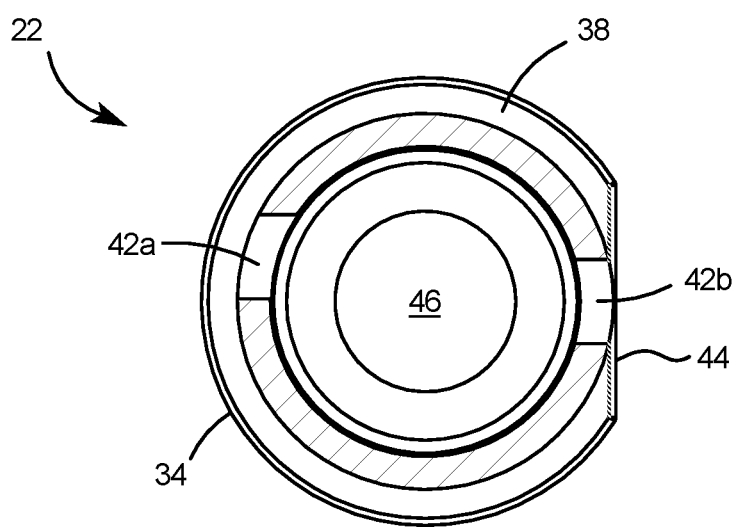
FIG. 3 is a sectional view of the connector body taken along line 3-3 of FIG. 2.

Referring to FIGS. 2 and 3, the connector body 22 includes a leading end 30, a trailing end 32, and a base flange 34 on the trailing end 32. As used herein, the term "leading end" 30 refers to the end of the fitting which is first advanced into the electrical box as it is secured thereto, and the term "trailing end" 32 refers to the end of the fitting that is opposed to the leading end. In the electrical fitting of the present invention, after insertion into the box, the leading end 30 resides outside the electrical box and the trailing end 32 resides inside the electrical box. The base flange 34 includes a leading face 33 and a trailing face 35. A portion of the connector body 22 is necked-down on the trailing end 32 adjacent the base flange 34 to form a reduced-diameter seat 36. The connector body 22 includes a flangeless main body portion 37 of a constant diameter extending from the seat 36 to the leading end 30 of the connector body. Main body portion 37 is flangeless as there are no flanges extending outward therefrom to interfere with the insertion of the main body portion 37 of the connector body 22 through a knock out aperture (not shown) in an electrical box. The main body portion 37 has a smaller diameter than the base flange 34 of the connector body 22. A nose portion 38 extends outward of the base flange 34 on the trailing end 32. The connector includes a trailing end portion 40 and a wider main body portion 37 with an opening 42 therein. As shown in FIG. 2, the outer diameter D5 of the seat 36 is preferably smaller than the outer diameter D6 of the main body portion 37 of the connector body 22.

As shown in FIG. 3, the base flange 34 includes a truncated portion 44 thereon. Most preferably, there are two openings 42a and 42b in the main body portion 37, which openings are preferably not coaxial with one another. A bore 46 extends through the substantially tubular connector body 22 and the openings are communicative with the bore.

Figure 4:
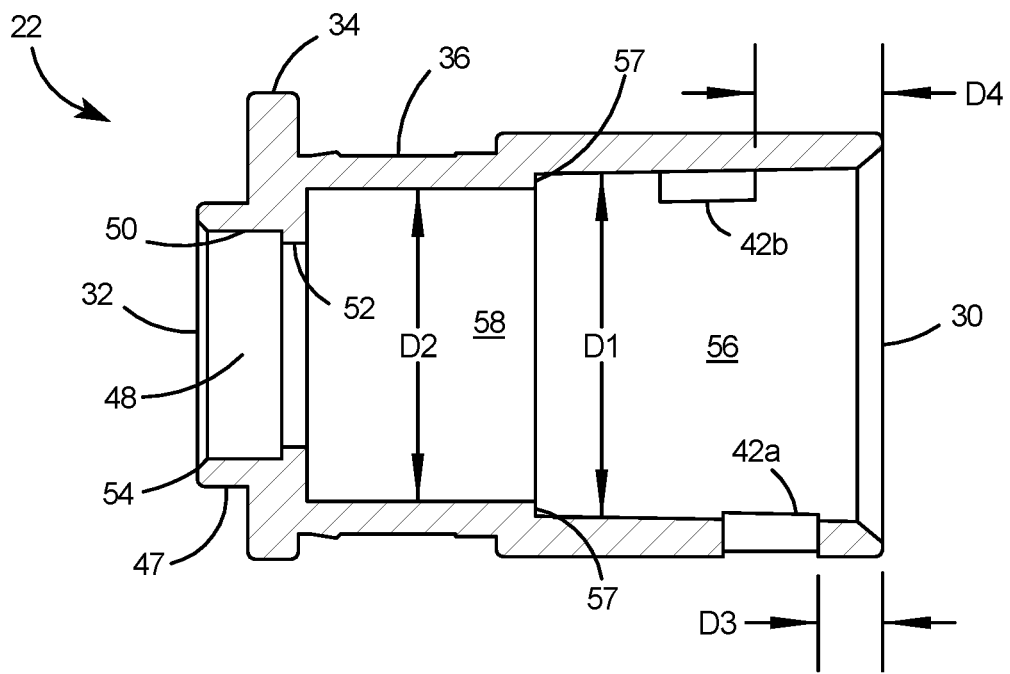
FIG. 4 is a sectional view of the connector body taken along line 4-4 of FIG. 2.

With reference to FIG. 4, the trailing end 32 of the connector body 22 includes a flange projection 47 that projects from the flange 34 and forms an inner seat 48 that is adapted to receive the optional throat liner. The inner seat 48 includes an outer recess 50, a lip 52, and a beveled inlet 54. The bore 46 includes a leading bore 56 in the main body portion 37 and a trailing bore 58 in the trailing end portion 40. The leading bore 56 includes a larger inside diameter D1 than the inside diameter D2 of the trailing bore 58. Stop 57 is formed at the transition of the leading bore and trailing bore. Stop 57 is the transition on the interior of connector body 22 from the larger diameter leading bore 56 to the smaller diameter trailing bore 58. The stop 57 functions to limit the distance of insertion of the internal snap ring 26 into the leading bore 56 of the connector body 22 (see FIG. 5). Opening 42a is offset from leading end 30 by distance D3 and opening 42b is offset from leading end by distance D4. Most preferably the openings are offset by different distances from the leading end 30.

With reference to FIG. 10, the external snap ring 24 is a split ring that includes a split 60, a leading end 62, a trailing end 64, and one or more locking tangs 66 bent outward from the split ring. The locking tangs 66 include a cantilevered end 68 and a free end 70. Free end 70 is oriented toward the trailing end 64 of the snap ring. The split 60 between the two ends of the external snap ring 24 enable the split ring to expand when force is applied to urge the ring to a wider diameter.

As shown in FIG. 11, internal snap ring 26 includes a leading end 72, a trailing end 74, and a split 76 therein. The internal snap ring 26 includes a gap 78 at the split to enable the internal snap ring to compress when force is applied to urge the ring to a smaller diameter. The internal snap ring 26 further includes locking tangs 80 that are bent outward of the ring and cable retaining tangs 82 that are bent inward of the ring. Locking tangs 80 include free ends 84 that are oriented toward the leading end 72 and cable retaining tangs 82 include free ends 86 that are oriented toward the trailing end 74 of the internal snap ring 26.

Referring to FIG. 12, throat liner 28 includes a leading end 88, a trailing end 90, a nose portion 92, and a flange 94.

Figure 5:
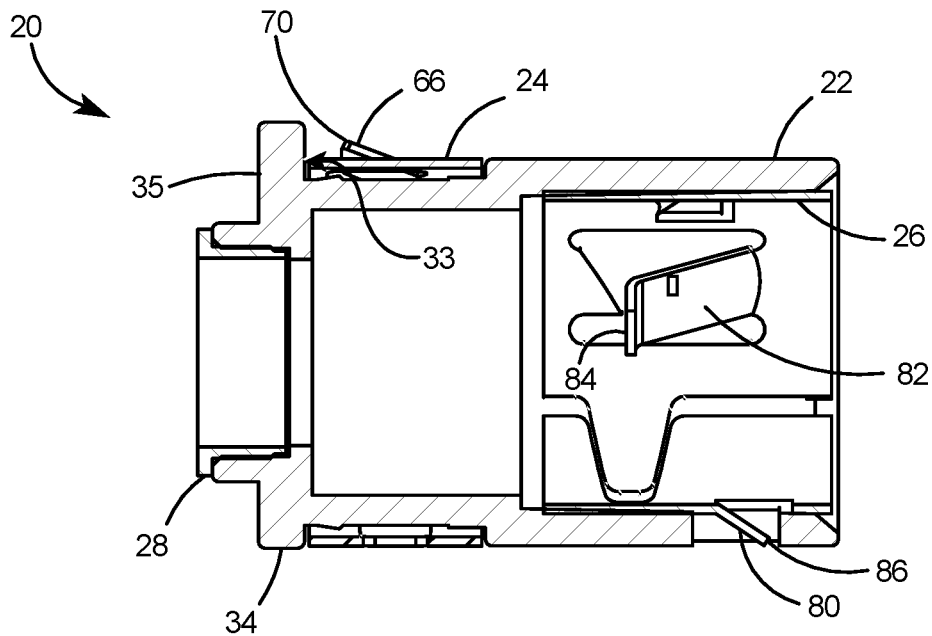
FIG. 5 is a sectional view of the electrical insider fitting assembly including the connector body with the external snap ring, internal snap ring, and throat liner.

Referring to FIG. 5, the electrical insider fitting 20 assembly includes the connector body 22, external snap ring 24, internal snap ring 26, and the optional throat liner 28.

Figure 6:
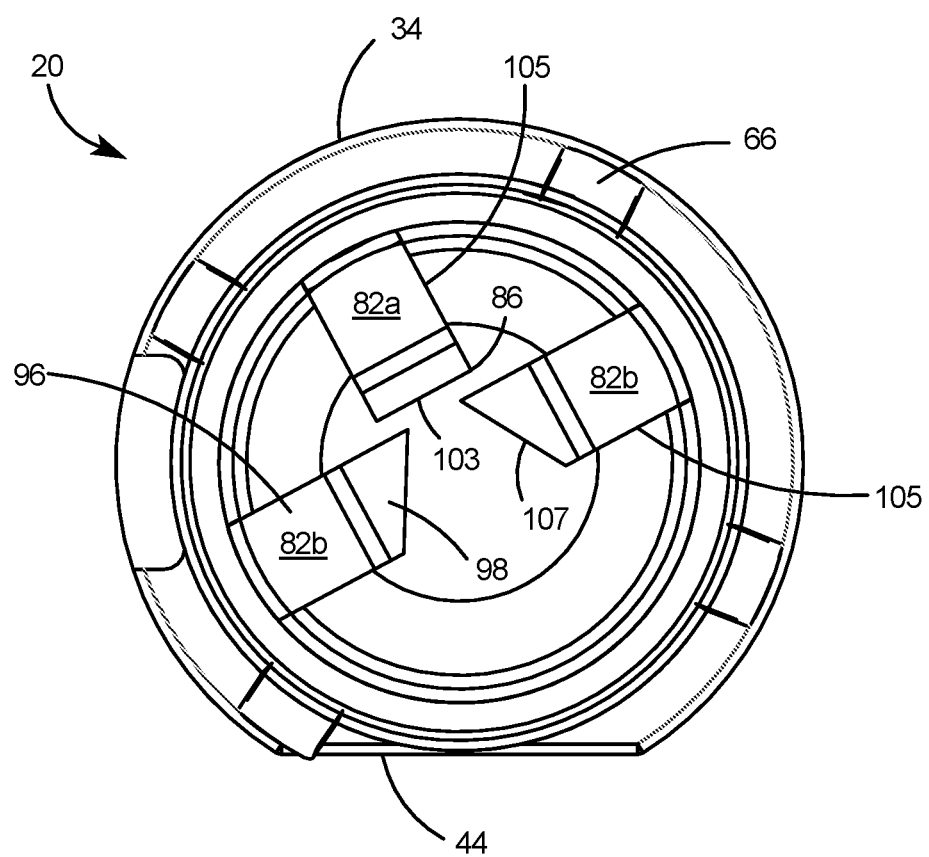
FIG. 6 is an end view of the assembled electrical insider fitting taken from the right side of FIG. 5.

With reference to FIG. 6, the electrical insider fitting 20 most preferably includes three of the cable retaining tangs 82 extending from the internal snap ring 26 including a middle tang 82a and two side tangs 82a. Each of the cable retaining tangs includes a base portion 96, an end portion 98 that is bent away from the base portion, and a free end 86. The middle tang 82a includes an edge 103 that is perpendicular to the sides 105 of the tang and the two side tangs 82a include edges 107 that are angled with respect to the sides. The truncated portion 44 of the base flange 34 enables the fitting 20 to be inserted within a knockout that is in close proximity to the wall of the electrical box.

Figure 7:
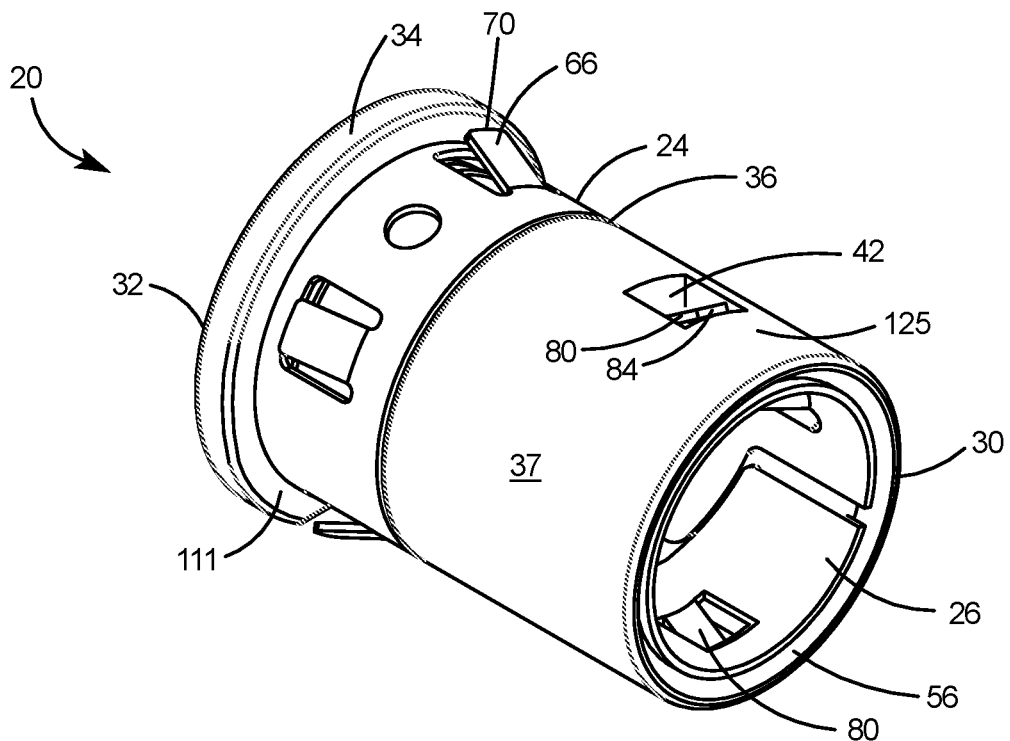
FIG. 7 is a front isometric view of the assembled electrical insider fitting.
Figure 8:
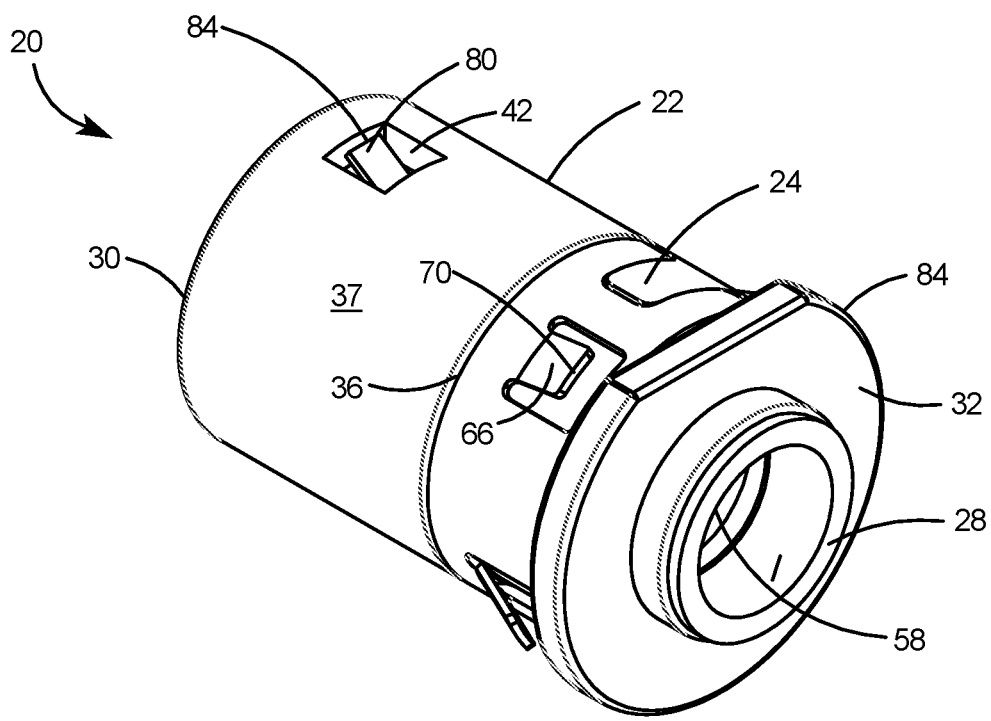
FIG. 8 is a rear isometric view of the assembled electrical insider fitting.

Referring to FIGS. 7 and 8, the assembled electrical insider fitting 20 includes the external snap ring 24 disposed on the reduced-diameter seat 36 on the trailing end 32 of the connector body 22. The optional throat liner 28, if used for a particular application, is pressed into the trailing bore 58 in the fitting. The optional throat liner 28 prevents abrasion of the wiring extending through the trailing end of the connector. Preferably, the throat liner 28 is constructed of a resilient electrically non-conductive material, such as plastic or rubber. Most preferably, the throat liner is constructed of plastic.

As shown in FIG. 7, the internal snap ring 26, being a split ring preferably constructed of a resilient metal, is compressed slightly and easily inserted within the leading bore 56 of the fitting. The internal snap ring 26 then expands to the full inner diameter of leading bore 56 and provides a tight fit of the internal snap ring within the connector body 22. Locking tangs 80 of internal snap ring 26 extend through the openings 42 and, in conjunction with openings 42a and 42b of connector body 22, provide a means of aligning the internal snap ring within the leading bore 56 in the leading end 30 of the connector body 22.

Referring to FIG. 8, external snap ring 24, also preferably constructed of a resilient metal, is expanded slightly and slipped onto the seat 36 of connector body 22, where it relaxes to its original smaller diameter and thereby is retained on the seat 36. Assembled connector body 22, external snap ring 24, and internal snap ring 26 form the electrical insider fitting 20.

Figure 9:
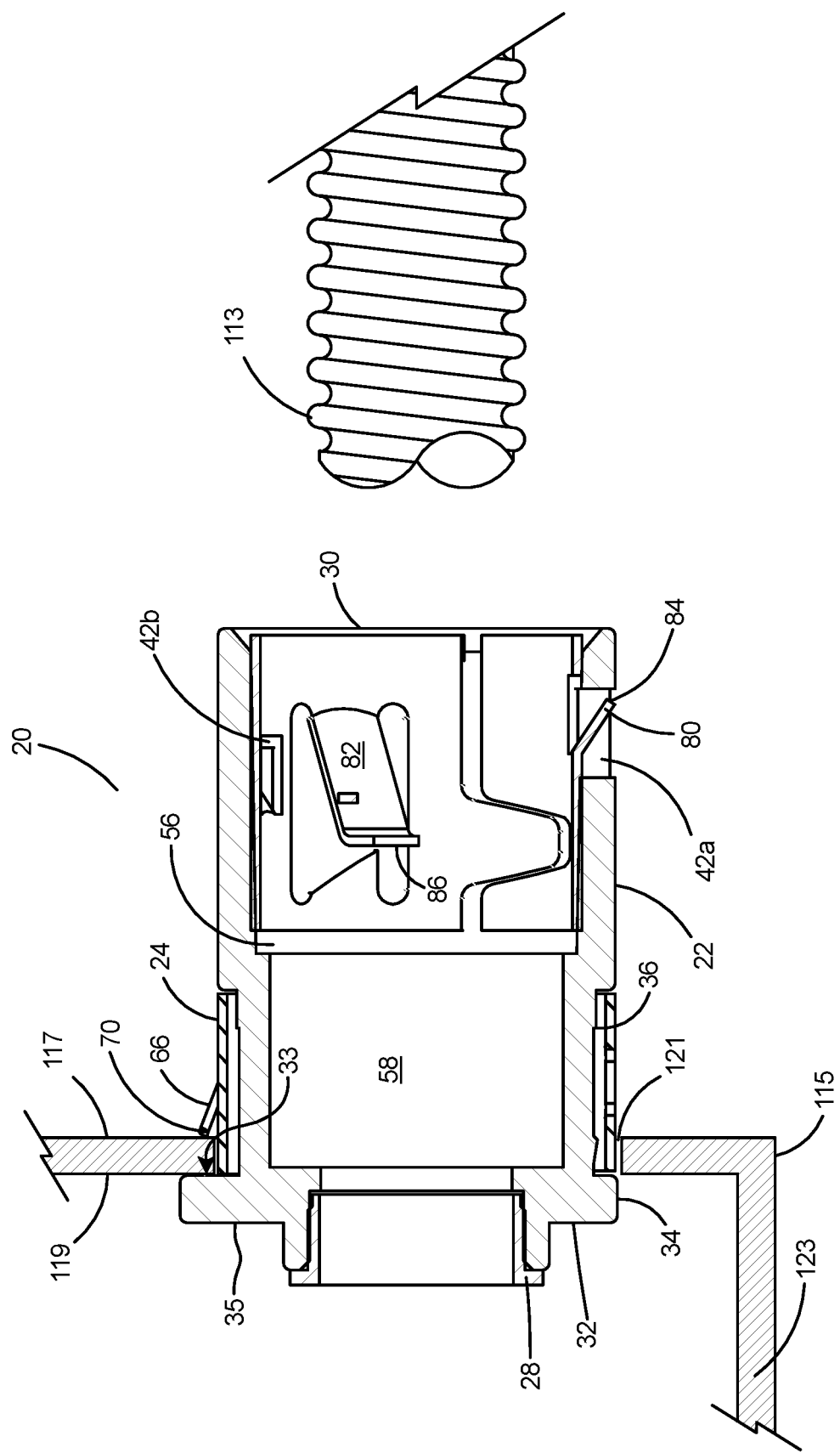
FIG. 9 is a sectional view of the electrical insider fitting including an electrical cable in alignment with the fitting to be inserted therein.

Reference is made to FIG. 9 for an understanding of the operation of the present invention. Although the electrical insider fitting 20 can be used in both new work and old work situations, it is most useful on old work electrical boxes where the drywall is already installed around the electrical box. The electrical insider fitting 20 enables an installer to pull electrical cable 113 into the existing box 115 and then use the insider fitting to secure the electrical cable to the box without having to remove drywall, which would be covering the outside 117 of the electrical box. The advantage of the electrical insider fitting 20 is that it can be installed from inside 119 the electrical box 115, thereby enabling the installer to avoid the substantial time required to remove and replace the drywall in order to secure the electrical cable to the box. The free end 70 of the locking tang 66 of the external snap ring 24 and the free end 84 of the cable retaining tang 82 of the internal snap ring 26 are oriented toward, or directed to, the trailing end 32 of the connector body 22. The free end 70 of the locking tang 66 of the external snap ring 24 and the free end 84 of the locking tang 80 of the internal snap ring 26 are oriented toward opposing ends of the connector body 22.

Figure 13:
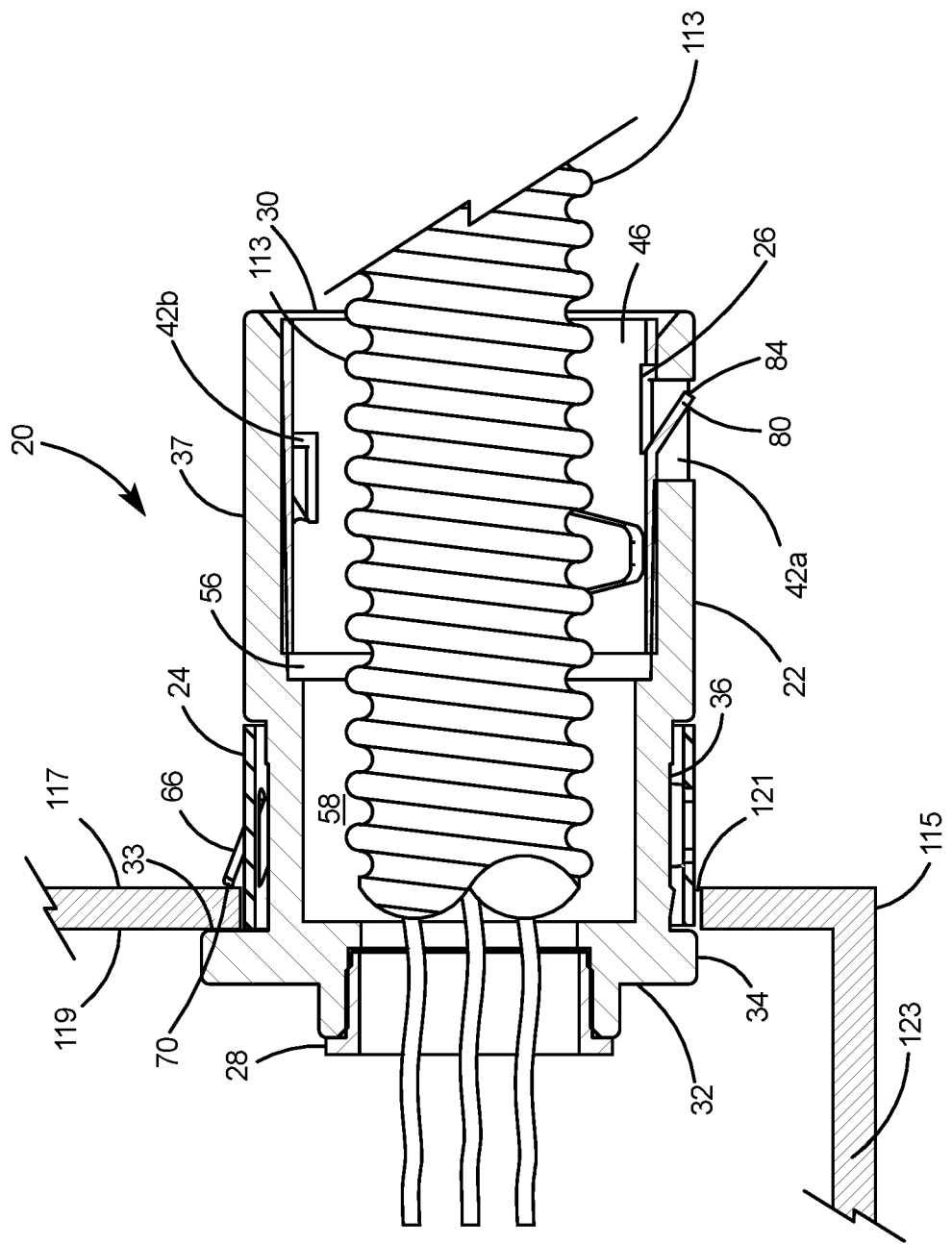
FIG. 13 is a sectional view of the electrical insider fitting depicting an electrical cable fully inserted and locked into the fitting assembly.

To operate the invention, from inside 119 the box, the leading end 30 of electrical insider fitting 20 is simply pressed through an existing knock-out hole 121 in the electrical box 115. The locking tangs 66 of external snap ring 24 are biased inwardly as the pass through the electrical box walls 123. As shown in FIG. 13, after clearing the walls 123 of the electrical box 115, the locking tangs 66 of external snap ring 24 snap outwardly and lock the fitting 20 to the electrical box 115. Electrical cable 113 is then inserted through internal bore 46 of fitting 20 until the cable is grasped by free ends 84 of cable retaining tangs 82. The free ends 84 of cable retaining tangs 82 lock the electrical cable 113 to the electrical box wall 123. As shown in FIG. 9, after being installed to the inside surface 119 of the electrical box 115, very little of the electrical insider fitting 20 projects into the interior volume of the electrical box. Only the flange 34 and a small portion of the throat liner 28 project into the interior volume of the box. As the throat liner 28 is optional, with omission of the throat liner, the only portion that will project into the interior volume is the flange 34, which preferably includes a maximum thickness of 0.10 inch. Thus, for those embodiments without a throat liner, the flange projection 47 of the connector body 22, as shown in FIG. 4, can be eliminated so that only the flange 34 extends within the interior volume of the box.

External snap ring 24 and internal snap ring 26 are most preferably constructed of spring steel. Connector body 22 most preferably is die-cast of metal. As shown in FIG. 9, the electrical insider fitting 20 provides good electrical continuity between the outer sheath of the electrical cable 113, the electrical box 115 and the fitting 20 itself including the external snap ring 24, the internal snap ring 26, and the connector body 22. A grounding path is established between the electrical box 115 and the connector body 22 by the flush contact of base flange 34 with the electrical box wall 123 and by the locking tangs in contact with the outside 117 of the electrical box wall. The locking tangs 66, being constructed of resilient metal, remain biased against the outside surface 117 of the box and thereby keep base flange 34 pressed tight against the box. At the same time, the tight fit of internal snap ring 26 within the connector body 22 keeps the internal snap ring locked within the leading end 30 of the connector body 22. Upon cable insertion, cable retaining tangs 82 tightly grasp the electrical cable 113, and the internal snap ring 26 maintains a bias against the internal walls of the connector body 22. Thus electrical continuity is established and maintained between the electrical cable 113, the electrical box 115, and the electrical insider fitting 20. Locking tangs 80 further assist in maintaining electrical continuity between the cable 113, the internal snap ring 26 and the connector body 22.

With reference to FIGS. 9 and 13, the present invention includes a method of securing an electrical fitting 20 to an electrical box 115 having a wall 123 with an inside surface 119 and a knockout aperture 121 therein, the method including 1) providing an electrical fitting 20 including a connector body 22 having a leading end 30, a trailing end 32, a main body portion 37 having a bore 46 therein including a leading bore 56 and a trailing bore 58, a base flange 34 on the trailing end 32 of the connector body 22, a leading face 33 on the base flange 34, a reduced-diameter seat 36 on the trailing end 32 of the connector body, an external snap ring 24 disposed on the seat 36 of the connector body, locking tangs 66 on the external snap ring 24, an internal snap ring 26 within the leading bore 56, and cable retaining tangs 82 on the internal snap ring 26; 2) inserting the leading end 30 of the connector body 22 into the knockout aperture 121 until the leading face 33 of the base flange 34 is flush with the inside surface 119 of the electrical box 115 and the locking tangs 66 of the snap ring 24 snap clear the wall 123 of the electrical box 115; and 3) inserting an electrical cable 113 into the bore 46 of the connector body until the cable retaining tangs 82 snap into the electrical cable and lock the electrical cable within the connector body 22.

With reference to FIG. 1, the connector body 22 is preferably die cast of zinc alloy in one-piece. The snap ring 24 and internal snap ring 26 are each preferably formed in one-piece of resilient spring steel. External snap ring 24 is a split ring that is preferably formed to a smaller diameter than the seat 36 on the trailing end 32 of the connector body 22. Thus, external snap ring 24 may be forcefully expanded and pressed over the leading end 30 of connector body until snapping onto the seat 36 at the trailing end 32 of the connector body. The external snap ring 24 is held onto the seat 36 by its resilient nature and tendency to spring back to its unbiased diameter.

Internal snap ring 26 is a split ring preferably formed to a larger diameter than the bore 46 in the leading end 30 of the connector body. As shown in FIG. 10, the internal snap ring 26 includes a cutout 120 on one end of the split 60 and a tongue 124 on the opposing side of the split 60. The split 60 permits slight compression of the internal snap ring 26 and thus easy insertion into the connector body 22 to form the electrical insider fitting 20 (see FIG. 1). Once the internal snap ring 26 expands to the full inner diameter of the die-cast connector body bore 26, a tight fit is formed of the internal snap ring within the connector body. Each locking tang 80 is offset from the leading end 62 of the internal snap ring 26 by a distance corresponding to one of the openings 42a and 42b in the connector body 22. The locking tangs 80 of the internal snap ring 26 in conjunction with the openings 42 in connector body provide an aligning arrangement 125 for aligning the internal snap ring 26 in the desired orientation within the connector body 22.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An electrical fitting for connecting an electrical cable to an electrical box having a wall, comprising:
   a connector body having a leading end including a main body portion with a leading bore for insertion through an access hole in the electrical box, and a trailing end with a trailing bore;
   a base flange on said trailing end of said connector body, said base flange including a leading face;
   a reduced-diameter seat on said trailing end of said connector body, said seat extending from said leading face of said base flange to said main body portion;
   an external snap ring disposed on said seat of said connector body, said external snap ring including a locking tang having a free end;
   an internal snap ring disposed within said leading bore of said connector body, said internal snap ring including a cable retaining tang; and said free end of said locking tang of said external snap ring and said free end of said cable retaining tang of said internal snap ring are oriented toward the trailing end of said connector body.

2. The electrical fitting of claim 1, including a retaining arrangement for retaining said internal snap ring within said leading bore of said connector body.

3. The electrical fitting of claim 2, wherein said retaining arrangement includes
an opening in said connector body; and
a locking tang extending outward from said internal snap ring and through said opening.

4. The electrical fitting of claim 1, including
an inner wall on said connector body; and
a stop on said inner wall of said connector body at the juncture of said leading bore and said trailing bore.

5. The electrical fitting of claim 1 wherein said base flange is of a larger diameter than the diameter of said main body portion of said connector body.

6. The electrical fitting of claim 1 further comprising a trailing face and a leading face on said base flange.

7. The electrical fitting of claim 1 wherein said leading face of said base flange and said free end of said locking tang of said external snap ring lock engage opposing sides of said electrical box wall.

8. The electrical fitting of claim 1 wherein engagement of said leading face of said base flange and said free end of said locking tang of said external snap ring lock said trailing end of said connector body to said electrical box.

9. The electrical fitting of claim 1 wherein said free end of said locking tang of said external snap ring and said free end of said cable retaining tang of said internal snap ring are oriented toward the trailing end of the connector body.

10. The electrical fitting of claim 1 wherein said free end of said locking tang of said external snap ring and said cable retaining tang of said locking tang of said internal snap ring are oriented toward the same end of the connector body.

11. The electrical fitting of claim 1 wherein said free end of said locking tang of said external snap ring and said free end of said locking tang of said internal snap ring are oriented toward opposing ends of the connector body.

* * * * *